(12) United States Patent
Delia et al.

(10) Patent No.: US 8,484,995 B2
(45) Date of Patent: Jul. 16, 2013

(54) GLASS MANUFACTURING APPARATUSES WITH PARTICULATE REMOVAL DEVICES AND METHODS OF USING THE SAME

(75) Inventors: Robert Delia, Horseheads, NY (US); Ahdi El Kahlout, Lexington, KY (US)

(73) Assignee: Corning Incorporated, Corning, NY (US)

( * ) Notice: Subject to any disclaimer, the term of this patent is extended or adjusted under 35 U.S.C. 154(b) by 259 days.

(21) Appl. No.: 12/955,125

(22) Filed: Nov. 29, 2010

(65) Prior Publication Data

US 2012/0131956 A1 May 31, 2012

(51) Int. Cl.
*C03B 17/06* (2006.01)

(52) U.S. Cl.
USPC ..................... 65/195; 65/27; 65/53

(58) Field of Classification Search
None
See application file for complete search history.

(56) References Cited

U.S. PATENT DOCUMENTS

| 3,666,084 | A | * | 5/1972 | Stehl | 198/866 |
| 5,163,369 | A | * | 11/1992 | Hawitt | 101/423 |
| 5,287,927 | A | * | 2/1994 | Pass et al. | 166/267 |
| 6,170,293 | B1 | | 1/2001 | Cody | 65/168 |
| 7,294,045 | B1 | | 11/2007 | Brown et al. | 451/44 |
| 2003/0181302 | A1 | * | 9/2003 | Kaiser et al. | 492/40 |
| 2006/0016219 | A1 | * | 1/2006 | Pitbladdo | 65/29.21 |
| 2006/0042314 | A1 | | 3/2006 | Abbott, III et al. | 65/25.3 |
| 2006/0086272 | A1 | * | 4/2006 | Bennet | 101/425 |
| 2008/0068920 | A1 | * | 3/2008 | Galliher et al. | 366/102 |
| 2010/0192989 | A1 | | 8/2010 | Dickerson et al. | 134/104.2 |
| 2011/0094267 | A1 | | 4/2011 | Aniolek et al. | 65/91 |

OTHER PUBLICATIONS

Exair, "Air Operated Conveyor", website: http://www.exair.com/en-US/Primary%20Navigation/Products/Air%20Operated%20Conveyors/Pages/Model%20Comparison.aspx, Wayback Machine date—Nov. 14, 2008.*

Mills, "Recommended values of thermophysical properties for selected commercial alloys", Woodhead Publishing, copyright 2002, pp. 132 and 140.*

* cited by examiner

*Primary Examiner* — Christina Johnson
*Assistant Examiner* — Lisa Herring
(74) *Attorney, Agent, or Firm* — Kevin M. Able

(57) ABSTRACT

Glass manufacturing apparatuses with particulate removal devices and methods for using the same are disclosed. In one embodiment, a fusion draw machine for forming a glass web from molten glass includes an enclosure and a first pull roll and a second pull roll rotatably positioned in an interior of an enclosure. The first pull roll and the second pull roll cooperate to draw a glass web in a draw direction. A particulate removal device for removing particulate matter from the interior of the enclosure is fluidly coupled to the enclosure and includes a vacuum nozzle disposed in the interior of the enclosure and fluidly coupled to a vacuum source with a vacuum line. A particulate filter is fluidly coupled to the vacuum nozzle and the vacuum source and traps particulate matter exhausted from the interior of the enclosure through the vacuum nozzle.

15 Claims, 5 Drawing Sheets

GLASS MANUFACTURING APPARATUSES WITH PARTICULATE REMOVAL DEVICES AND METHODS OF USING THE SAME

BACKGROUND

1. Field

The present specification generally relates to glass manufacturing apparatuses and, more specifically, to fusion draw machines with particulate removal devices and glass manufacturing apparatuses incorporating the same.

2. Technical Background

Glass substrates are commonly utilized in a variety of consumer electronic devices including smart phones, lap-top computers, LCD displays and similar electronic devices. The quality of the glass substrates used in such devices is important for both the functionality of such devices as well as the aesthetics of such devices. For example, defects and/or flaws present in the glass substrates may interfere with the optical properties of the glass substrates and, as a result, may degrade the performance of the electronic devices in which the glass substrates are employed. Moreover, defects and/or flaws in glass substrates which are visually discernable may adversely impact consumer perception of the electronic device in which the glass substrates are employed.

The source and type of defects in glass substrates may vary. In some instances, defects are introduced into the glass substrates after the glass has been formed into a substrate from molten glass batch materials. For instance, particulate matter that becomes embedded in the surface of the glass substrate as the glass substrate is drawn during manufacture creates defects commonly called onclusions. The onclusions cannot be readily washed off or removed from the glass substrate and, as such, glass substrates with onclusions are discarded as scrap as a quality control measure which decreases production efficiencies and increases production costs.

Accordingly, a need exists for alternative apparatuses for mitigating onclusion defects in glass manufacturing apparatuses.

SUMMARY

The embodiments disclosed herein relate to fusion draw machines which mitigate the occurrence of onclusion defects on glass substrates caused by particulate matter. Also described herein are glass manufacturing apparatuses which incorporate such fusion draw machines as well as methods for drawing glass webs with reduced onclusion defects caused by particulate matter in a glass manufacturing apparatus.

According to one embodiment, a fusion draw machine for forming molten glass into a glass web with reduced onclusion defects caused by particulate matter is disclosed. The fusion draw machine includes an enclosure and a forming vessel for receiving molten glass and forming the molten glass into a glass web. A first pull roll and a second pull roll are rotatably positioned in an interior of the enclosure. The first pull roll and the second pull roll cooperate to draw a glass web between the first pull roll and the second pull roll in a draw direction. A particulate removal device for removing particulate matter from the interior of the enclosure is coupled to the enclosure such that the particulate removal device is capable of drawing a stream of exhaust gas and entrained particulate matter from the interior of the enclosure. The particulate removal device includes a vacuum nozzle disposed in the interior of the enclosure. The vacuum nozzle is fluidly coupled to a vacuum source with a vacuum line. The vacuum source draws a vacuum through the vacuum nozzle to facilitate exhausting the particulate matter and the stream of exhaust gas from the interior of the enclosure as the glass web is drawn by the first pull roll and the second pull roll. A particulate filter is fluidly coupled to the vacuum nozzle and the vacuum source such that the particulate filter traps particulate matter exhausted from the interior of the enclosure through the vacuum nozzle.

According to another embodiment, a glass manufacturing apparatus which reduces the occurrences of onclusion defects caused by particulate matter is disclosed. The glass manufacturing apparatus includes a melting vessel for melting glass batch materials to form molten glass. A fining vessel for receiving the molten glass from the melting vessel and removing removing bubbles from the molten glass. A fusion draw machine receives the molten glass from the fining vessel, wherein the fusion draw machine comprises an enclosure and a forming vessel forming the molten glass into a glass web. A pull roll assembly is positioned in an interior of the enclosure and receives the glass web and draws the glass web in a downward draw direction. The glass manufacturing apparatus also includes a particulate removal device for removing particulate matter from the interior of the enclosure. The particulate removal device generally includes a vacuum nozzle positioned in the interior of the enclosure and fluidly coupled to a vacuum source. The vacuum source draws a vacuum through the vacuum nozzle to exhaust particulate matter and exhaust gas from the interior of the enclosure. A particulate filter is fluidly coupled to the vacuum nozzle and the vacuum source such that the particulate filter traps particulate matter exhausted from the interior of the enclosure through the vacuum nozzle. A cooling jacket is positioned around a vacuum line fluidly coupling the vacuum nozzle to the enclosure. The cooling jacket cools the exhaust gas exhausted from the interior of the enclosure.

In yet another embodiment, a method for drawing a glass web with reduced onclusions includes melting glass batch materials to form molten glass and forming the molten glass into a glass web with a fusion draw machine. The fusion draw machine includes an enclosure, a forming vessel, and a pull roll assembly with a particulate removal device. The forming vessel and the pull roll assembly are positioned in the enclosure and the particulate removal device is fluidly coupled to the enclosure. The glass web is drawn through the enclosure with the pull roll assembly. An exhaust gas stream and particulate matter is exhausted from an interior of the enclosure proximate to the pull roll assembly with the particulate removal device as the glass web is drawn through the enclosure.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
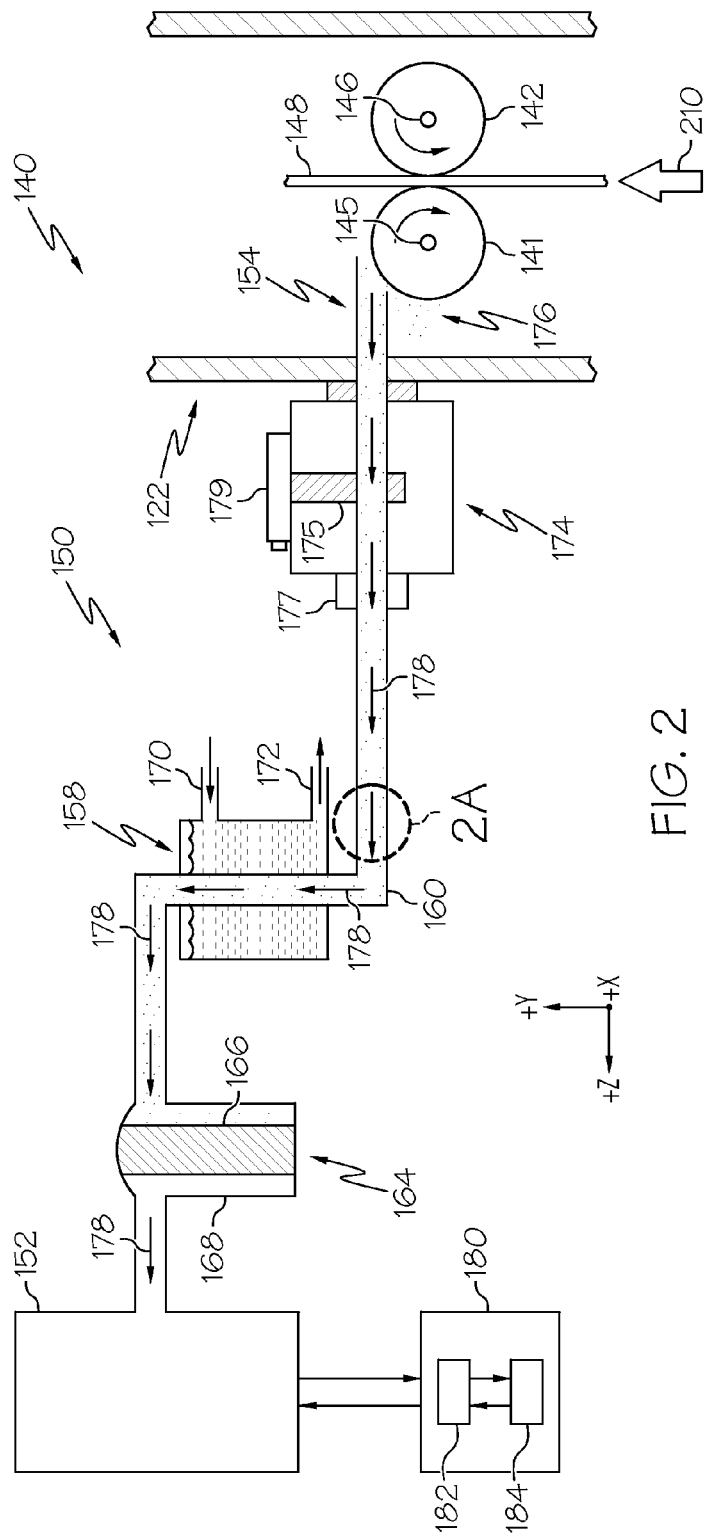
FIG. 2 schematically depicts a partial cross section of the glass manufacturing apparatus of FIG. 1 illustrating the pull roll assembly and particulate removal device.

Reference will now be made in detail to various embodiments of fusion draw machines with particulate removal devices and glass manufacturing apparatuses utilizing the same, examples of which are illustrated in the accompanying drawings. Whenever possible, the same reference numerals will be used throughout the drawings to refer to the same or like parts. One embodiment of a portion of a fusion draw machine with a particulate removal device is schematically depicted in FIG. 2. The fusion draw machine includes an enclosure in which a pull roll assembly having a first pull roll and a second pull roll is rotatably positioned. A vacuum nozzle of the particulate removal device is positioned in the enclosure. The vacuum nozzle is connected to a particulate filter and a vacuum source such that a vacuum may be drawn through the vacuum nozzle. The fusion draw machine with the particulate removal device and methods for using the fusion draw machine in a glass manufacturing apparatus to reduce the instance of onclusions in glass webs will be described in more detail herein.

Figure 1:
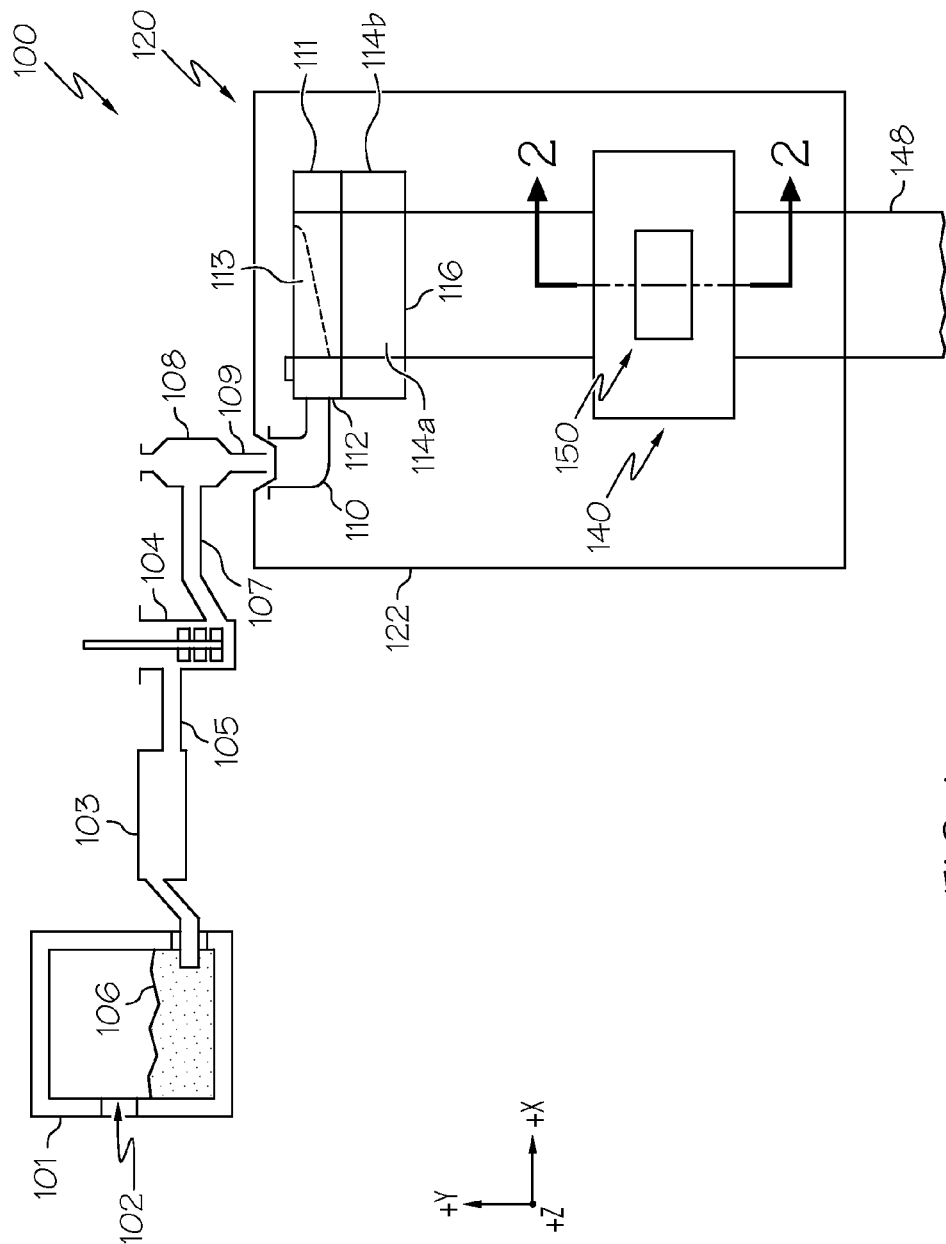
FIG. 1 schematically depicts a glass manufacturing apparatus according to one or more embodiments shown and described herein.

Referring now to FIG. 1, one embodiment of an exemplary glass manufacturing apparatus 100 is schematically depicted which utilizes a fusion draw machine having a particulate removal device. The glass manufacturing apparatus 100 includes a melting vessel 101, a fining vessel 103, a mixing vessel 104, a delivery vessel 108, and a fusion draw machine (FDM) 120. Glass batch materials are introduced into the melting vessel 101 as indicated by arrow 102. The batch materials are melted to form molten glass 106. The fining vessel 103 has a high temperature processing area that receives the molten glass 106 from the melting vessel 101 and in which bubbles are removed from the molten glass 106. The fining vessel 103 is fluidly coupled to the mixing vessel 104 by a connecting tube 105. That is, molten glass flowing from the fining vessel 103 to the mixing vessel 104 flows through the connecting tube 105. The mixing vessel 104 is, in turn, fluidly coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110, a forming vessel 111, a pull roll assembly 140 and a particulate removal device 150 are positioned. As shown in positioned. As shown in FIG. 1, the molten glass 106 from the downcomer 109 flows into an inlet 110 which leads to the forming vessel 111. The forming vessel 111 includes an opening 112 that receives the molten glass 106 which flows into a trough 113 and then overflows and runs down two converging sides 114a and 114b before fusing together at a root, where the two sides join, before being drawn downward by the pull roll assembly 140 to form a glass web 148. The particulate removal device exhausts an exhaust gas stream and particulate matter from the enclosure 122 as the glass web 148 is drawn between the rolls of the pull roll assembly 140. Thus, particulate matter present in the enclosure is evacuated from the interior of the enclosure before becoming embedded in the heated glass web and forming onclusions.

Referring now to FIG. 2, a cross section of a portion of the fusion draw machine of FIG. 1 is schematically depicted illustrating the pull roll assembly 140 and the particulate removal device 150 of the fusion draw machine 120. As shown in FIG. 2, the pull roll assembly 140 includes a first pull roll 141 and a second pull roll 142 which are positioned in the enclosure 122 of the fusion draw machine. The first pull roll 141 and the second pull roll 142 are oriented in parallel with one another such that the first pull roll 141 and the second pull roll 142 cooperate to draw a glass web 148 in a downward draw direction which is the −Y direction in the embodiment shown in FIG. 2. In the embodiments described herein, the first pull roll 141 and the second pull roll 142 may be driven pull rolls, such as when the first pull roll 141 and the second pull roll 142 are actively rotated with a motor to draw the glass web 148. Alternatively, the first pull roll 141 and the second pull roll 142 may be passively rotated, such as when one or more other pull rolls and/or pairs of pull rolls (not shown) in the fusion draw machine impart a pulling force to the glass web 148. While FIG. 2 depicts a single pair of pull rolls (i.e., the first pull roll 141 and the second pull roll 142), it should be understood that, in other embodiments, the enclosure 122 of the fusion draw machine may include a plurality of pairs of pull rolls.

Figure 4A:
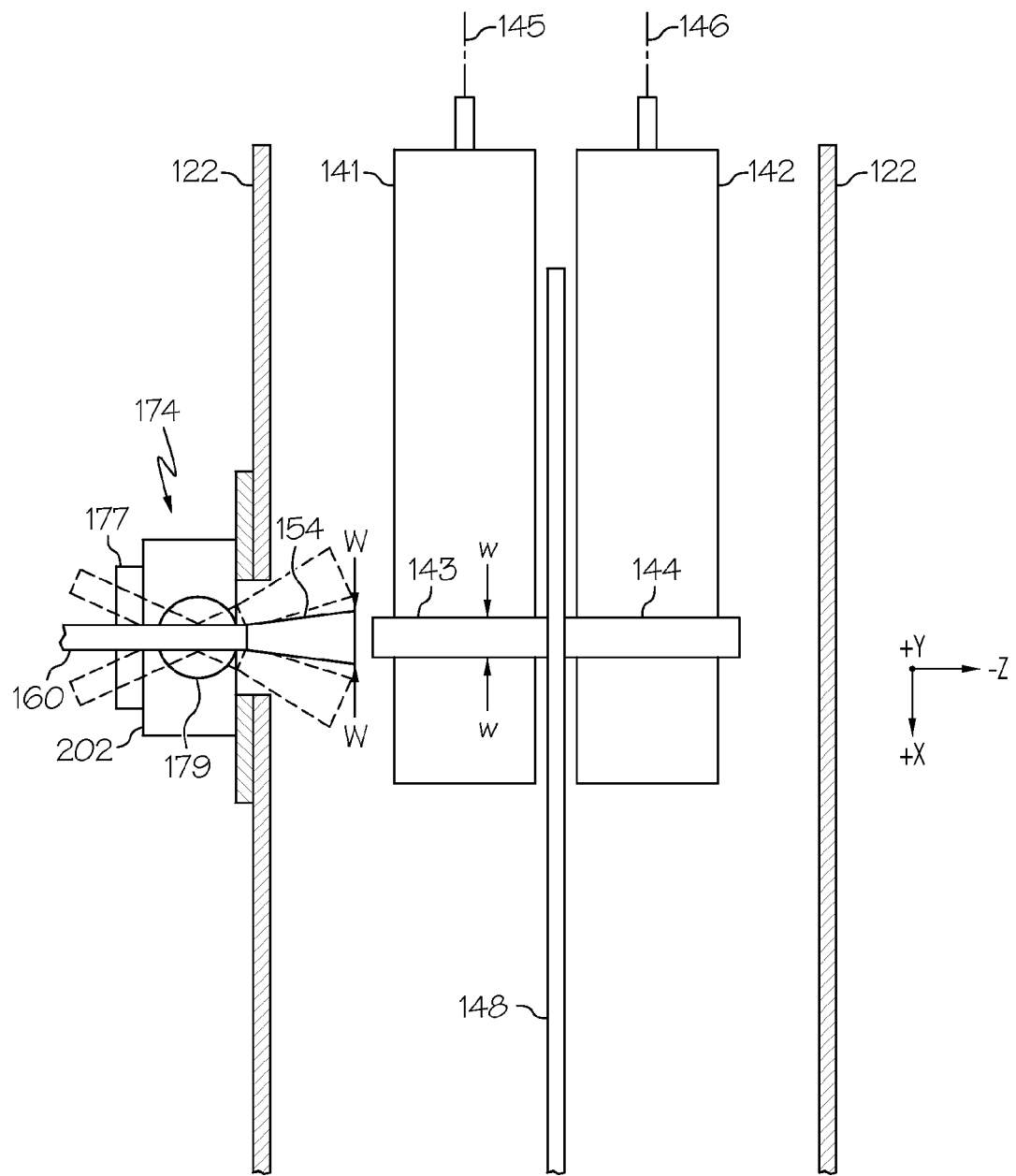
FIG. 4A schematically depicts a partial top view of the pull roll assembly of FIG. 2 illustrating the vacuum nozzle in multiple positions with respect to the enclosure.

In the embodiments shown and described herein, the first pull roll 141 and the second pull roll 142 may be formed with a raised annular flat which contacts the glass web 148 and provides the downward draw force to the glass web 148. For example, FIG. 4A depicts a top view of the first pull roll 141 and the second pull roll 142 and the raised annular flat 143, 144 of 144 of each pull roll, respectively. In the embodiments shown and described herein, the raised annular flats 143, 144 may generally have an axial width w in an axial direction (i.e., in the X-direction of the coordinate axes shown in FIG. 4A). In one embodiment, the axial width w of the raised annular flats is less than the lateral width W of the tip portion of the vacuum nozzle 154, as will be described in more detail herein.

While the first pull roll 141 and the second pull roll 142 have been described herein as comprising a pair of raised annular flats, it should be understood that, in other embodiments (not shown), the first pull roll 141 and the second pull roll 142 may be formed without raised annular flats, such as when the first pull roll 141 and the second pull roll 142 contact the glass web 148 across the entire width of the glass web 148.

Figure 2A:
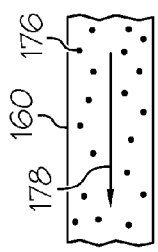
FIG. 2A is a close up view of a portion of the vacuum line of the particulate removal device of FIG. 2.

Referring now to FIGS. 2 and 2A, the particulate removal device 150 generally comprises a vacuum nozzle 154, a vacuum line 160, a cooling jacket 158, a particulate filter 164, and a vacuum source 152. In the embodiment of the particulate removal device 150 depicted in FIG. 2, the particulate removal device 150 further comprises a positioning device 174. However, it should be understood that the positioning device 174 is optional and that, in some embodiments, the particulate removal device 150 is constructed without a positioning device 174. In the embodiments described herein, the vacuum nozzle 154 is positioned in the interior of the enclosure 122 and coupled to the vacuum line 160, which, in turn, is coupled to the vacuum source 152. That is, the vacuum source 152, vacuum line 160 and vacuum nozzle 154 are connected such that, when the vacuum source 152 draws a vacuum through the vacuum nozzle 154, an exhaust gas stream 178 (indicated by arrows in FIGS. 2 and 2A), as well as any particulate matter 176 entrained in the exhaust gas stream 178, is evacuated from the enclosure 122 through the vacuum nozzle 154 and the vacuum line 160. In one embodiment, the vacuum line 160 is constructed from a flexible piping material which is capable of withstanding high temperatures such as, for example, braided metal hoses and/or high temperature rubber hoses. In another embodiment, the vacuum line 160 is constructed from a combination of flexible piping and rigid piping, such as when one or more sections of rigid piping are connected with one or more sections of flexible piping.

Still referring to FIG. 2, the vacuum line 160 is connected to a vacuum source 152 which, in the embodiments described herein, is a vacuum pump. In these embodiments, the vacuum line 160 is directly connected to the vacuum source 152 as depicted in FIG. 2. However, in other embodiments (not shown), the vacuum source 152 may be a port coupled to a centralized vacuum system. In still other embodiments, the vacuum source 152 may be a fan which draws the exhaust gas stream 178 from the interior of the enclosure 122 through the vacuum line 160.

In some embodiments, the vacuum source 152 is operable to draw an exhaust gas stream 178 from the interior of the enclosure 122 at a rate from about 20 standard cubic feet/hour (scth) (0.567 normalized cubic meters/hour (ncmh)) to about 100 scth (2.831 ncmh), preferably from about 40 scth (1.132 ncmh) to about 100 scth (2.831 ncmh) and, more preferably, from about 50 scth (1.416 ncmh) to about 100 scth (2.831 ncmh). However, it should be understood that the rate at which the exhaust gas stream 178 is drawn from the enclosure 122 is dependent on the size of the enclosure, the number of particulate removal devices positioned in the enclosure 122, and similar variables. Accordingly, in some embodiments, the rate at which the exhaust gas stream is removed from the enclosure 122 may be less than 100 scth (2.831 ncmh) or more than 100 scth (2.831 ncmh).

In the embodiment shown in FIG. 2, the vacuum source 152 is electrically coupled to a control unit 180 such that control signals are exchanged between the control unit 180 and the vacuum source. The control unit 180 controls the rate at which the exhaust gas stream 178 is evacuated from the enclosure 122 by the vacuum source 152, the time of operation of the vacuum source 152, and/or the frequency of operation of the vacuum source 152. For example, the control unit 180 may be programmed to activate the vacuum source 152 at a specific time interval and/or upon the occurrence of a specific event and switch the vacuum source 152 off after a predetermined time has elapsed. In the embodiments shown in FIG. 2, the control unit 180 further comprises a memory 182 electrically coupled to a processor 184. The memory 182 contains a computer readable and executable set of instructions which, when executed by the processor 184, facilitates control of the vacuum source 152 by the control unit 180.

Still referring to FIG. 2, the particulate removal device 150 further comprises a particulate filter 164 which is fluidly coupled to the vacuum line 160 between the vacuum nozzle 154 and the vacuum source 152 such that the exhaust gas stream 178 drawn from the enclosure 122 through the vacuum nozzle 154 and vacuum line 160 passes through the particulate filter 164. The particulate filter 164 generally comprises a filter medium 166 positioned in a filter bowl 168. The exhaust gas stream 178 drawn from the interior of the enclosure 122 and through the vacuum line 160 is drawn through the filter bowl 168 of the particulate filter 164 where particulate matter 176 entrained in the exhaust gas stream 178 is collected in the filter medium 166 positioned in the filter bowl 168 while the exhaust gas stream 178 passes through the filter medium 166. In some embodiments, the filter medium is suitable for filtering particulate matter 10 microns or larger. In other embodiments the filter medium is suitable for filtering particulate matter 5 microns or larger. In still other embodiments, the filter medium is suitable for filtering particulate matter 1 micron or larger or even 0.1 micron or larger.

In the embodiments shown and described herein, the filter medium 166 is removably positioned in the filter bowl 168 such that the filter medium 166 may be removed from the particulate filter 164 and cleaned, replaced, or otherwise processed. For example, in one embodiment, the filter medium 166 may be removed from the particulate filter 164 and the particulate matter 176 contained in the filter medium 166 may be analyzed to determine the source of the particulate matter 176. Such information may be utilized to determine if maintenance and/or cleaning of the glass manufacturing apparatus needs to be performed or if external contaminants are being drawn into the glass manufacturing apparatus.

Still referring to FIG. 2, the interior of the enclosure 122 is generally at an elevated temperature as heat radiated from the glass web 148 as the glass web 148 is drawn through the interior of the enclosure 122 heats the air on the interior of the enclosure 122. Accordingly, the exhaust gas stream 178 exhausted from the interior of the enclosure 122 is also at an elevated temperature which, in some embodiments, may be as high as 900° C. to 1000° C. depending on the vertical position of the vacuum nozzle 154 (i.e., the location of the vacuum nozzle in the y-direction of the coordinate axes shown in FIG. 2). In some embodiments, the particulate embodiments, the particulate removal device 150 further comprises a cooling device, such as cooling jacket 158. In the embodiment shown in FIG. 2, the cooling jacket 158 is positioned around the vacuum line 160 between the vacuum nozzle 154 and the particulate filter 164 such that the exhaust gas stream is cooled before reaching the particulate filter 164. In this embodiment, the cooling jacket 158 comprises a cooling inlet 170 and a cooling outlet 172. A coolant pump (not shown) circulates cooling fluid 162 into the cooling jacket 158 through the cooling inlet 170 such that the cooling fluid 162 circulates around the vacuum line 160 in the cooling jacket 158 thereby drawing heat from the exhaust gas stream 178 into the cooling fluid 162. The cooling fluid 162 exits out of the cooling outlet 172 carrying away the heat from the exhaust gas stream 178 with it. The heat imparted to the cooling fluid 162 is dissipated to the ambient atmosphere, such as by radiator coils or the like (not shown) before the cooling fluid 162 is re-circulated to the cooling jacket 158.

Referring now to FIGS. 2 and 3A-3C, one embodiment of a vacuum nozzle 154 for use with the particulate removal device 150 is schematically depicted. The vacuum nozzle 154 is formed from a metallic alloy capable of withstanding elevated temperatures (i.e., temperatures equal to or greater than 1000° C.) without losing its strength and structural integrity. Further, the material from which the vacuum nozzle 154 is constructed generally has a high emissivity such that heat radiated from the glass web 148 and trapped in the interior of the enclosure 122 (FIGS. 1 and 2) does not build up on the vacuum nozzle 154. Such heat buildup may create a "hot spot" in the interior of the enclosure 122 which, in turn, can alter the cooling rate of the glass web 148 as it traverses through the enclosure 122. Instead, the high emissivity material of the vacuum nozzle 154 readily re-radiates the heat into the interior of the enclosure thereby avoiding the creation of a "hot spot". In one embodiment, the vacuum nozzle is formed from a metallic material or a ceramic material which has an emissivity of greater than about 0.5 or even greater than about 0.7. Suitable materials from which the vacuum nozzle 154 may be formed include, without limitation, refractory ceramics, stainless steel alloys, such as 316 grade stainless steel, nickel-based alloys, such as Haynes 214® nickel-based alloy, or any other material suitable for use at elevated temperatures. Further, it is contemplated that one or more coatings may be applied to the vacuum nozzle 154 in order to increase the emissivity of the vacuum nozzle.

In the embodiments of the vacuum nozzle 154 shown and described herein, the vacuum nozzle 154 extends between an inboard end 186 and an outboard end 188 and comprises a coupling portion 190 proximate the inboard end 186 and a tip portion 192 proximate the outboard end 188.

Figure 3A:
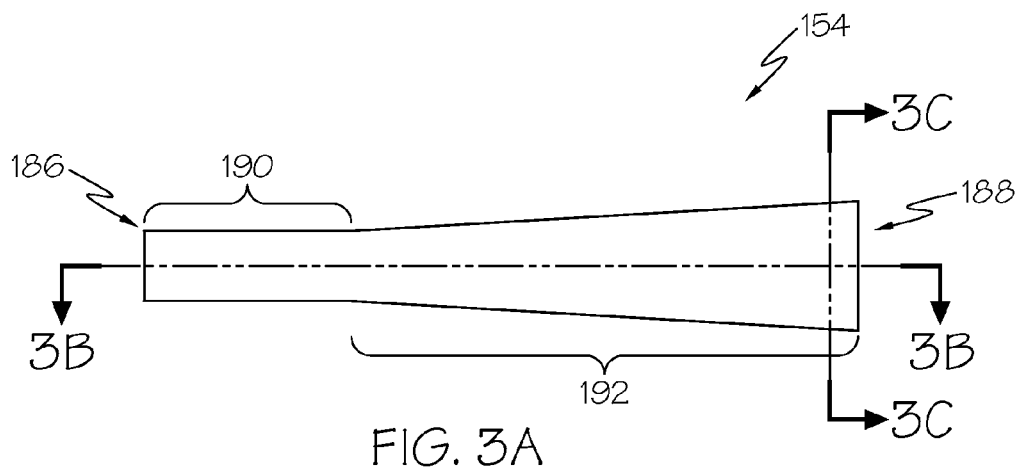
FIG. 3A-3C schematically depict a vacuum nozzle of a particulate removal device according to one or more embodiments shown and described herein.
Figure 3B:
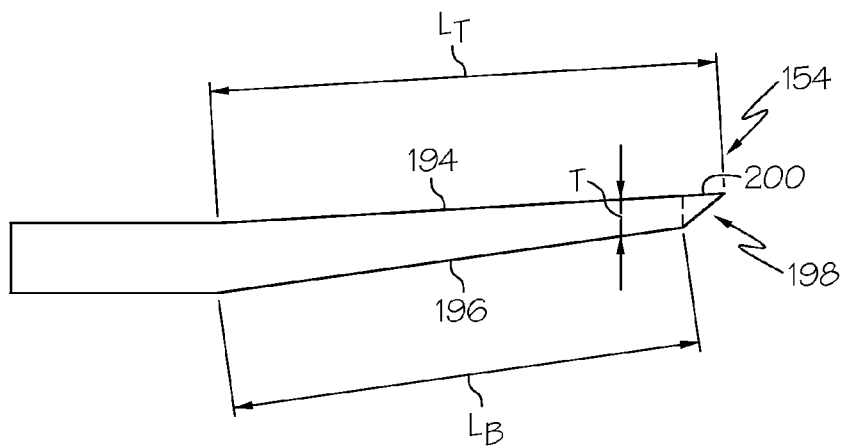
Figure 3C:
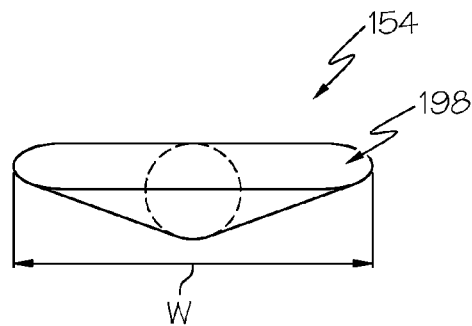

Still referring to FIGS. 2 and 3A-3B, the inboard end 186 of the vacuum nozzle 154 is configured to be connected to the vacuum line 160. The tip portion 192 of the vacuum nozzle 154 has a lateral width W which increases from the coupling portion 190 to the outboard end 188. In the embodiments of the vacuum nozzle 154 shown and described herein, the lateral width W at the outboard end 188 of the tip portion 192 is greater than an axial width w of the raised annular flats 143, 144 of the first pull roll 141 and the second pull roll 142 (FIG. 4A). In embodiments where the vacuum nozzle 154 is positioned to collect particulate matter from the raised annular flat of the pull rolls, forming the vacuum nozzle 154 such that the outboard end 188 of the tip portion 192 has a lateral width W greater than the axial width w of the raised annular flats of the pull rolls maximizes the collection of particulate matter which may be ejected from the surface of the raised annular flat and, as such, reduces the likelihood that such particulate matter will become embedded in the surface of the glass web 148 as an onclusion.

In the embodiments of the vacuum nozzle shown in FIGS. 3A-3B the thickness T of the tip portion 192 of the vacuum nozzle 154 tapers from the coupling portion 190 to the outboard end 188. For example, in one embodiment, the bottom surface 196 of the tip portion 192 tapers towards the top surface 194 of the vacuum nozzle 154 from the coupling portion 190 to the outboard end 188 such that the opening 198 formed in the outboard end 188 of the vacuum nozzle 154 is oval-shaped in cross section. In this embodiment, the top surface 194 of the vacuum nozzle has a length $L_T$ which is longer than the length $L_B$ of bottom surface 196 of the vacuum nozzle 154 which creates a hood portion 200 extending over the opening 198. The hood portion 200 assists in deflecting particulate into the vacuum nozzle 154. In embodiments where the vacuum nozzle 154 is positioned to collect particulate matter from the raised annular flat of the pull rolls, the hood portion 200 facilitates positioning the tip portion 192 of the vacuum nozzle 154 in close proximity to the pull rolls of the pull roll assembly.

While the opening 198 of the vacuum nozzle 154 has been shown and described herein as comprising an oval geometrical configuration, it is contemplated that the opening of the vacuum nozzle may have other geometrical configurations including, without limitation, circular geometries, rectangular geometries and the like.

Figure 4B:
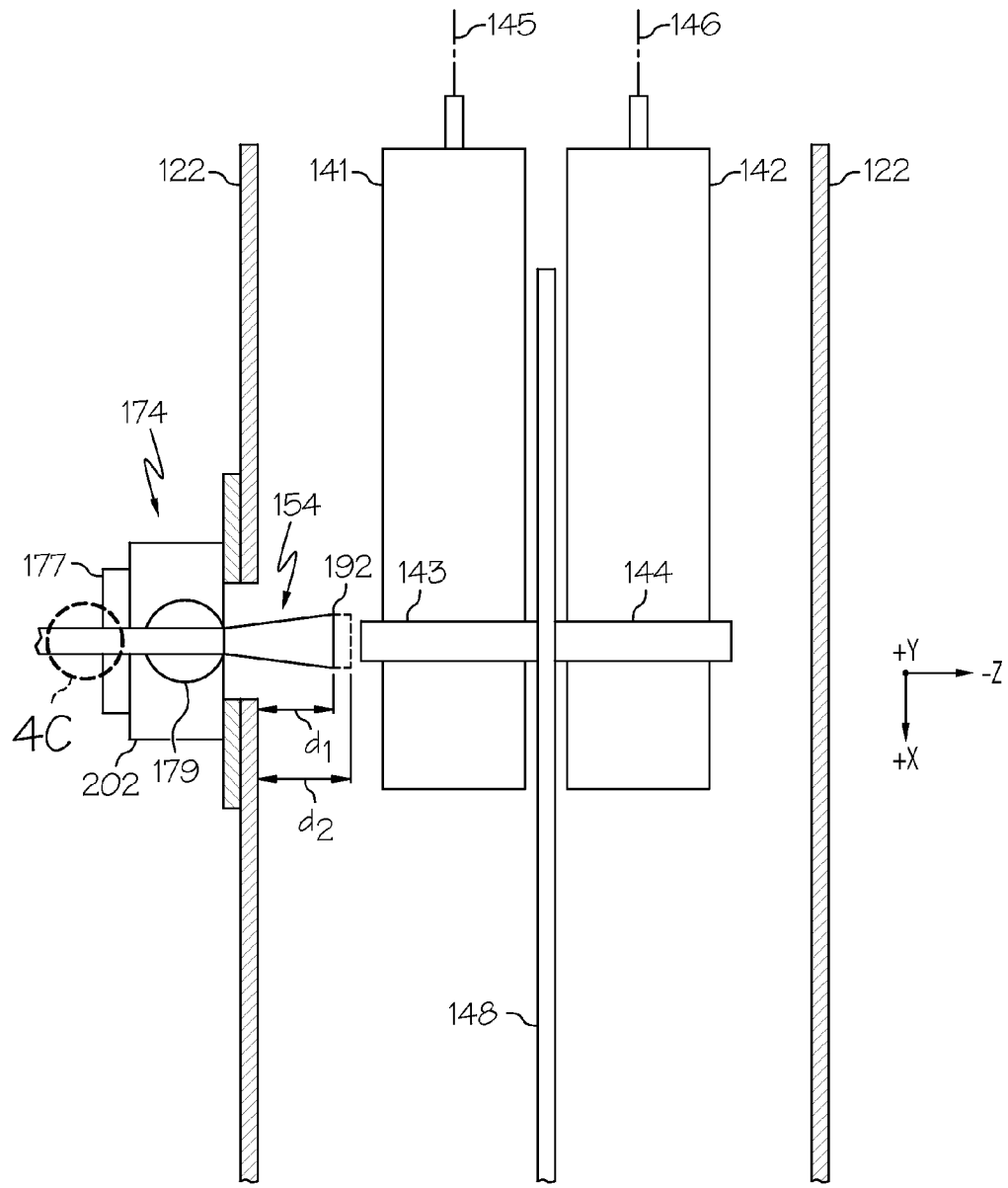
FIG. 4B schematically depicts a partial top view of the pull roll assembly of FIG. 2 illustrating the vacuum nozzle at different insertion depths with respect to the enclosure.

Referring now to FIGS. 2 and 4A-4B, the particulate removal device 150 further comprises a positioning device 174 which facilitates positioning the vacuum nozzle 154 of the particulate removal device 150 with respect to the pull rolls 141, 142. For example, in one embodiment the positioning device 174 facilitates adjusting an axial position of the vacuum nozzle 154 with respect to an axial length of the first pull roll 141 by facilitating rotation of the vacuum nozzle 154 about an axis of rotation which is substantially perpendicular to the axes of rotation 145, 146 of the first pull roll 141 and the second pull roll 142. For example, as depicted in FIG. 4A, the first pull roll 141 is rotatable about an axis of rotation 145 which is parallel with the X-direction of the coordinate axes depicted in FIG. 4A. Similarly, the second pull roll 142 is rotatable about an axis of rotation 146 which is parallel to the X-direction of the coordinate axes depicted in FIG. 4. In this embodiment, the positioning device 174 facilitates rotating the vacuum nozzle 154 about an axis of rotation which is substantially perpendicular to the axes of rotation of the first pull roll 141 and the second pull roll 142 (i.e., an axis of rotation parallel to the Y-direction of the coordinate axes shown in FIG. 4A) such that the axial position of the vacuum nozzle 154 is adjustable with respect to the axial length of the first pull roll 141 and/or the second pull roll 142 (i.e., the length of the first pull roll and/or the length of the second pull roll in the ±X-direction of the coordinate axes depicted in FIG. 4A).

Referring to FIGS. 2 and 4A, to facilitate adjusting an axial position of the vacuum nozzle 154 along an axial length of the first pull roll 141 and/or the second pull roll 142, the positioning device 174 comprises a rotating stage 179 which is mechanically coupled to the vacuum nozzle 154 with a rotating linkage 175 such that the vacuum nozzle 154 rotates with the rotating linkage 175. The rotating stage 179 is positioned on the body 202 of the positioning device 174 and the rotating linkage 175 is positioned within the body 202 and connected to the connected to the rotating stage 179 such that the rotating linkage 175 is rotatable with respect to the body 202. The vacuum nozzle 154 extends through the rotating linkage 175 such that, when the rotating stage 179 is rotated, the rotational motion of the stage is imparted to the vacuum nozzle 154 with the rotating linkage 175. In the embodiment shown in FIGS. 2 and 4A, the rotating stage 179 is rotatable about an axis of rotation parallel to the Y-axis of the coordinate system depicted in FIGS. 2 and 4A. Accordingly, it should be understood that the vacuum nozzle 154 is rotatable about an axis of rotation which is parallel with the Y-axis, as schematically illustrated in FIG. 4A.

In one embodiment, the positioning device 174 also facilitates adjusting an insertion depth of the vacuum nozzle 154 in the enclosure 122. The position of the vacuum nozzle 154 may be slidably adjusted in the body 202 of the positioning device 174 such that the vacuum nozzle 154 is adjusted from a first insertion depth $d_1$ relative to the enclosure 122 to a second insertion depth $d_2$ relative to the enclosure 122. In embodiments where the vacuum nozzle 154 is positioned to collect particulate matter from the annular flat of the first pull roll, adjusting the tip portion 192 of the vacuum nozzle 154 relative to the first pull roll 141 and, more specifically, adjusting the position of the tip portion 192 of the vacuum nozzle 154 relative to the raised annular flat 143 of the first pull roll 141 enables particulate matter 176 ejected from the first pull roll 141 to be collected and exhausted from the interior of the enclosure 122 thereby preventing such particulate matter from becoming embedded in the glass web 148 as onclusions.

Figure 4C:
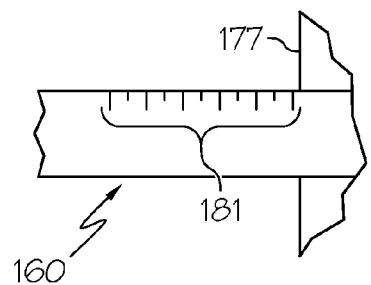
FIG. 4C schematically depicts a portion of the vacuum nozzle of FIG. 4B showing measurement indicia for determining an insertion depth of the vacuum nozzle into the enclosure.

To facilitate positioning and securing the vacuum nozzle 154 relative to the enclosure 122, the body 202 of the positioning device 174 further comprises a locking collar 177 in which the vacuum nozzle 154 is slidably positioned. The locking collar 177 may include one or more fasteners (not shown) such as set screws, thumb screws, jam nuts, or the like, which may be used to secure the vacuum nozzle 154 relative to the locking collar 177. Such fasteners may be loosened to adjust the insertion depth of the vacuum nozzle 154 with respect to the enclosure 122 and thereafter re-tightened to secure the vacuum nozzle 154 in the locking collar 177. In one embodiment, the vacuum nozzle 154 may further comprise a plurality of measurement indicia 181 indicating the insertion depth of the vacuum nozzle 154 into the enclosure 122, as depicted into the enclosure 122, as depicted in FIG. 4C.

In the embodiments described herein the positioning device 174 facilitates adjusting the position of the vacuum nozzle 154 along an axial length of the pull rolls 141, 142 and adjusting an insertion depth of the vacuum nozzle 154 with respect to the enclosure 122. However, it should be understood that, in other embodiments (not shown), the positioning device 174 may be operable to adjust the position of the vacuum nozzle 154 along an axial length of the pull rolls 141, 142 or adjust an insertion depth of the vacuum nozzle 154 with respect to the enclosure 122.

Referring again to FIGS. 1 and 2, as the heated glass web 148 is drawn downward (i.e., in the −Y-direction of the coordinate axes shown in FIGS. 1 and 2), air (indicated by arrow 210) radiantly heated by the glass web 148 rises upwards (i.e., in the +Y-direction of the coordinate axes shown in FIG. 2) through the enclosure 122. As the air rises upwards through the enclosure 122, particulate matter 176 on the interior of the enclosure 122 is carried upwards with the air 210. Accordingly, in embodiments where the particulate removal device is positioned over the pull rolls situated at the upper end of the enclosure proximate to the forming vessel 111, the vacuum nozzle 154 of the particulate removal device 150 is positioned above the pull rolls 141, 142, as depicted in FIG. 2, in order to capture and collect particulate matter 176 drawn upwards through the enclosure 122. This configuration is particularly useful when the particulate removal device 150 is used in conjunction with pull rolls which are situated at the upper end of the enclosure 122 proximate to the forming vessel 111.

However, in other embodiments (not shown), the vacuum nozzle 154 of the particulate removal device 150 may be positioned beneath the pull rolls in order to collect particulate matter 176 which falls downward (i.e., in the −Y-direction of the coordinate axes shown in FIGS. 1 and 2). This configuration is useful where the particulate removal device 150 is used in conjunction with pull rolls positioned at the lower end of the enclosure 122, further away from the forming vessel 111.

In the embodiments described herein, the fusion draw machine 120 has been described described as comprising a particulate removal device 150 with a single vacuum nozzle 154. However, it should be understood that, in other embodiments, the particulate removal device 150 may comprise multiple vacuum nozzles each of which are coupled to the vacuum source 152. In another alternative, the fusion draw machine may comprise multiple particulate matter removal devices, such as when a dedicated particulate matter removal device is paired with each pull roll of the pull roll assembly.

The operation of the glass manufacturing apparatus 100 with the fusion draw machine having a particulate removal device 150 will now be described with reference to FIGS. 1, 2 and 4A.

As described hereinabove, the forming vessel 111 of the fusion draw machine 120 forms the molten glass 106 into a glass web 148 which is drawn downwards with the pull roll assembly 140. Specifically, the glass web 148 is directed between the first pull roll 141 and the second pull roll 142 which contact the glass web 148 and draw the glass web in a downward direction through the enclosure as the pull rolls 141, 142 are rotated. In embodiments where the pull roll assembly 140 comprises pull rolls 141, 142 having raised annular flats 143, 144, as depicted in FIG. 4A, the glass web 148 is impinged between the raised annular flats 143, 144 which impart a downward draw force to the glass web 148.

As pull rolls 141, 142 draw the glass web 148 downward, particulate matter 176 in the enclosure is a potential source of onclusions, particularly for softer portions of the glass web which are at elevated temperatures. Such particulate matter 176 may be introduced into the interior of the enclosure 122 from the pull rolls 141, 142 or from other sources. For example, air drawn into the enclosure from the ambient environment may contain particulate matter which may form onclusions on the glass web 148. To prevent the particulate matter from forming onclusions, the vacuum source 152 of the particulate removal device 150 exhausts an exhaust gas stream 178 containing entrained particulate matter 176 from the interior of the enclosure 122 thereby preventing the particulate matter from becoming embedded in the glass web 148 and thereby forming onclusions.

In one embodiment, the exhaust gas stream 178 is directed through a cooling jacket 158 which cools the exhaust gas stream 178. In another embodiment, the exhaust gas stream 178 is filtered with a particulate filter 164 to remove the entrained particulate matter 176 from the exhaust gas stream 178. In embodiments where the exhaust gas stream 178 is cooled, the exhaust gas stream is cooled prior to being filtered. The filtered particulate matter 176 may be analyzed to determine the source of the particulate matter 176 so that remedial measures may be taken to prevent the introduction of the particulate matter 176 into the enclosure 122.

In some embodiments of the glass manufacturing apparatus 100 described herein, the particulate removal device 150 may be continuously operated as the glass web 148 is drawn from the fusion draw machine 120. In other embodiments, the particulate removal device 150 may be intermittently operated as the glass web 148 is drawn from the fusion draw machine 120. For example, in some embodiments, the particulate removal device 150 may be operated at a predetermined frequency which coincides with the build-up of particulate matter 176 on the interior of the enclosure 122 as the glass manufacturing apparatus 100 is operated. The predetermined frequency may be determined empirically based on the amount of particulate matter 176 found in the system as a function of the operating time of the system. In yet another embodiment, the particulate removal device 150 is utilized to remove particulate matter 176 from the interior of the enclosure 122 after a specific event. For example, the particulate removal device 150 may be utilized during start-up of the glass manufacturing apparatus 100 to remove particulate matter introduced into the system as the glass web 148 is threaded through the pull roll assembly 140. Similarly, the particulate removal device 150 may be utilized to remove particulate matter introduced into the system after the pull rolls of the pull roll assembly 140 have been replaced and/or other maintenance has been performed on the glass manufacturing apparatus 100.

It should now be understood that the pull roll assemblies with particulate removal devices described herein may be utilized to mitigate the occurrence of onclusions in a glass web due to particulate matter as the glass web is formed in a glass manufacturing apparatus. The particulate removal devices described herein may also be used to identify the source of particulate matter exhausted from the interior of the enclosure such that remedial measures may may be taken to eliminate the source of the particulate matter.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A fusion draw machine for forming a glass web from molten glass, the fusion draw machine comprising:
an enclosure;
a forming vessel for receiving molten glass and forming the molten glass into the glass web; a first pull roll and a second pull roll rotatably positioned in an interior of the enclosure, wherein the first pull roll and the second pull roll cooperate to draw the glass web between the first pull roll and the second pull roll in a draw direction;
a particulate removal device for removing particulate matter from the interior of the enclosure, the particulate removal device comprising:
a vacuum nozzle disposed in the interior of the enclosure and having an emissivity of greater than about 0.5, wherein the vacuum nozzle is fluidly coupled to a vacuum source with a vacuum line, the vacuum source drawing a vacuum through the vacuum nozzle to exhaust particulate matter and an exhaust gas stream from the interior of the enclosure as the glass web is drawn by the first pull roll and the second pull roll; and
a particulate filter fluidly coupled to the vacuum nozzle and the vacuum source, the particulate filter trapping particulate matter exhausted from the interior of the enclosure through the vacuum nozzle.

2. The fusion draw machine of claim 1, further comprising a cooling jacket positioned around the vacuum line and cooling the exhaust gas stream exhausted from the interior of the enclosure.

3. The fusion draw machine of claim 1, wherein the vacuum nozzle is rotatable about an axis of rotation which is substantially perpendicular to the axis of rotation of the first pull roll such that an axial position of the vacuum nozzle is adjustable with respect to an axial length of the first pull roll.

4. The fusion draw machine of claim 1, wherein the vacuum nozzle is slidably positioned in a locking collar such that an insertion depth of the vacuum nozzle in the enclosure is adjustable with respect to the enclosure.

5. The fusion draw machine of claim 1, wherein the vacuum nozzle is positioned above the first pull roll.

6. The fusion draw machine of claim 1, wherein:
the first pull roll comprises a first annular flat and the second pull roll comprises a second annular flat, wherein the first annular flat and the second annular flat contact the glass web and draw the glass web in the draw direction; and
a tip portion of the vacuum nozzle is positioned in the interior of the enclosure opposite the first annular flat and spaced apart from the first annular flat.

7. The fusion draw machine of claim 6, wherein the tip portion of the vacuum nozzle has a lateral width which is greater than or equal to an axial width of the first annular flat.

8. The fusion draw machine of claim 1, further comprising a vacuum control unit electrically coupled to the vacuum source, the vacuum control unit controlling a time of operation of the particulate removal device, a frequency of operation of the particulate removal device, an amount of vacuum drawn by the particulate removal device or combinations thereof.

9. A glass manufacturing apparatus comprising:
a melting vessel for melting glass batch materials to form molten glass;
a fining vessel receiving the molten glass from the melting vessel and removing bubbles from the molten glass;
a fusion draw machine receiving the molten glass from the fining vessel, the fusion draw machine comprising:
an enclosure;
a forming vessel forming the molten glass into a glass web;
a pull roll assembly positioned in an interior of the enclosure, the pull roll assembly receiving the glass web and drawing the glass web in a downward draw direction;
a particulate removal device for removing particulate matter from the interior of the enclosure, the particulate removal device comprising:
a vacuum nozzle positioned in the interior of the enclosure and fluidly coupled to a vacuum source drawing a vacuum through the vacuum nozzle to exhaust particulate matter and exhaust gas from the interior of the enclosure; a particulate filter fluidly coupled to the vacuum nozzle and the vacuum source such that particulate matter and exhaust gas exhausted from the interior of the enclosure passes through the particulate filter, wherein the particulate filter traps particulate matter exhausted from the interior of the enclosure through the vacuum nozzle;
a nozzle positioning device mechanically coupled to the vacuum nozzle, the nozzle positioning device comprising a rotating linkage mechanically coupled to a rotating stage and the vacuum nozzle such that the vacuum nozzle is rotatable about an axis of rotation which is substantially perpendicular to an axis of rotation of a first pull roll of the pull roll assembly such that the vacuum nozzle is positionable along an axial length of the first pull roll; and
a cooling jacket positioned around a vacuum line fluidly coupling the vacuum nozzle to the enclosure, the cooling jacket cooling the exhaust gas exhausted from the interior of the enclosure.

10. The glass manufacturing apparatus of claim 9, wherein the pull roll assembly comprises a first pull roll and a second pull roll positioned in an interior of the enclosure, wherein the first pull roll and the second pull roll cooperate to draw the glass web in the downward draw direction.

11. The glass manufacturing apparatus of claim 9, further comprising a nozzle positioning device mechanically coupled to the vacuum nozzle, the nozzle positioning device comprising a locking collar in which the vacuum nozzle is slidably positioned, wherein the nozzle positioning device facilitates adjusting an insertion depth of the vacuum nozzle in the enclosure.

12. The glass manufacturing apparatus of claim 9, wherein the nozzle positioning device further facilitates adjusting an insertion depth of the vacuum nozzle in the enclosure.

13. The glass manufacturing apparatus of claim 9, wherein:
the pull roll assembly comprises a first pull roll and a second pull roll positioned in an interior of the enclosure;
the first pull roll comprises a first annular flat and the second pull roll comprises a second annular flat, wherein the first annular flat and the second annular flat contact the glass web and draw the glass web in the downward draw direction; and the vacuum nozzle is positioned in the interior of the enclosure opposite the first annular flat and spaced apart from the first annular flat.

14. The glass manufacturing apparatus of claim 13, wherein a tip portion of the vacuum nozzle has a lateral width which is greater than or equal to an axial width of the first annular flat.

15. The glass manufacturing apparatus of claim 9, further comprising a vacuum control unit electrically coupled to the vacuum source, the vacuum control unit controlling a time of operation of the particulate removal device, a frequency of operation of the particulate removal device, an amount of vacuum drawn by the particulate removal device or combinations thereof.

* * * * *